United States Patent [19]

Droulon et al.

[11] Patent Number: 5,253,138
[45] Date of Patent: Oct. 12, 1993

[54] SIMPLIFIED SUPPLYING SYSTEM OF THE POSITION IDENTIFICATION POTENTIOMETERS OF ELECTRONIC MEMORY MECHANISMS OF A MOTOR FOR SETTING AUTOMOBILE VEHICLE SEATS AND THE LIKE

[75] Inventors: Georges Droulon; Yannick Leroy; Philippe Lhomer, all of Flers, France

[73] Assignee: ETS Cousin Freres, Orne, France

[21] Appl. No.: 825,744

[22] Filed: Jan. 24, 1992

Related U.S. Application Data

[63] Continuation-in-part of Ser. No. 547,599, Jul. 2, 1990, abandoned.

[30] Foreign Application Priority Data

Jul. 4, 1989 [FR] France ................ 89 08952

[51] Int. Cl.⁵ .............................. G05B 19/42
[52] U.S. Cl. ............................ 361/245; 307/10.1; 307/356; 318/568.1
[58] Field of Search .............. 364/424.05; 296/65.1; 297/344; 307/355, 356, 358, 540, 9.1, 10.1; 341/155-158; 318/568.1, 255, 466, 467; 361/245

[56] References Cited

U.S. PATENT DOCUMENTS

| | | | |
|---|---|---|---|
| 4,204,255 | 5/1980 | Cremer | 364/424.05 |
| 4,264,849 | 4/1981 | Fleischer et al. | 318/568.1 |
| 4,316,155 | 2/1982 | Hanisko | 307/261 X |
| 4,404,632 | 9/1983 | Harada et al. | 364/424.05 |
| 4,412,387 | 11/1983 | Lenko | 33/361 |
| 4,656,585 | 4/1987 | Stephenson | 364/424.06 |
| 4,682,088 | 7/1987 | Sullivan | 318/568.1 |
| 4,900,995 | 2/1990 | Wainwright | 318/443 |
| 4,929,878 | 5/1990 | Hansen | 318/560 |

OTHER PUBLICATIONS

Seitzer, D. et al., Electronic Analog-to-Digital Converters, John Wiley and Sons, Chichester, N.Y., 1983 p. 220, 1983.

Primary Examiner—A. D. Pellinen
Assistant Examiner—Fritz M. Fleming
Attorney, Agent, or Firm—Robert W. Becker & Associates

[57] ABSTRACT

A setting in position identification potentiometer is connected to terminals of the motor. The motor is supplied with a voltage ($U_{feed}$) possibly variable and switchable between two reverse polarity states according to rotation direction. The potentiometer has a slider which is connected via a first dividing bridge to input of an analog-digital converter subjected to a reference voltage ($U_{ref}$) connected to same possibly variable voltage via a second dividing bridge. Output of the analog-digital converter is connected to an electronic module. The resistor value at the ground of each of the two dividing bridges is respectively equal to a product of the other resistor value by a same multiplying coefficient A.

1 Claim, 1 Drawing Sheet

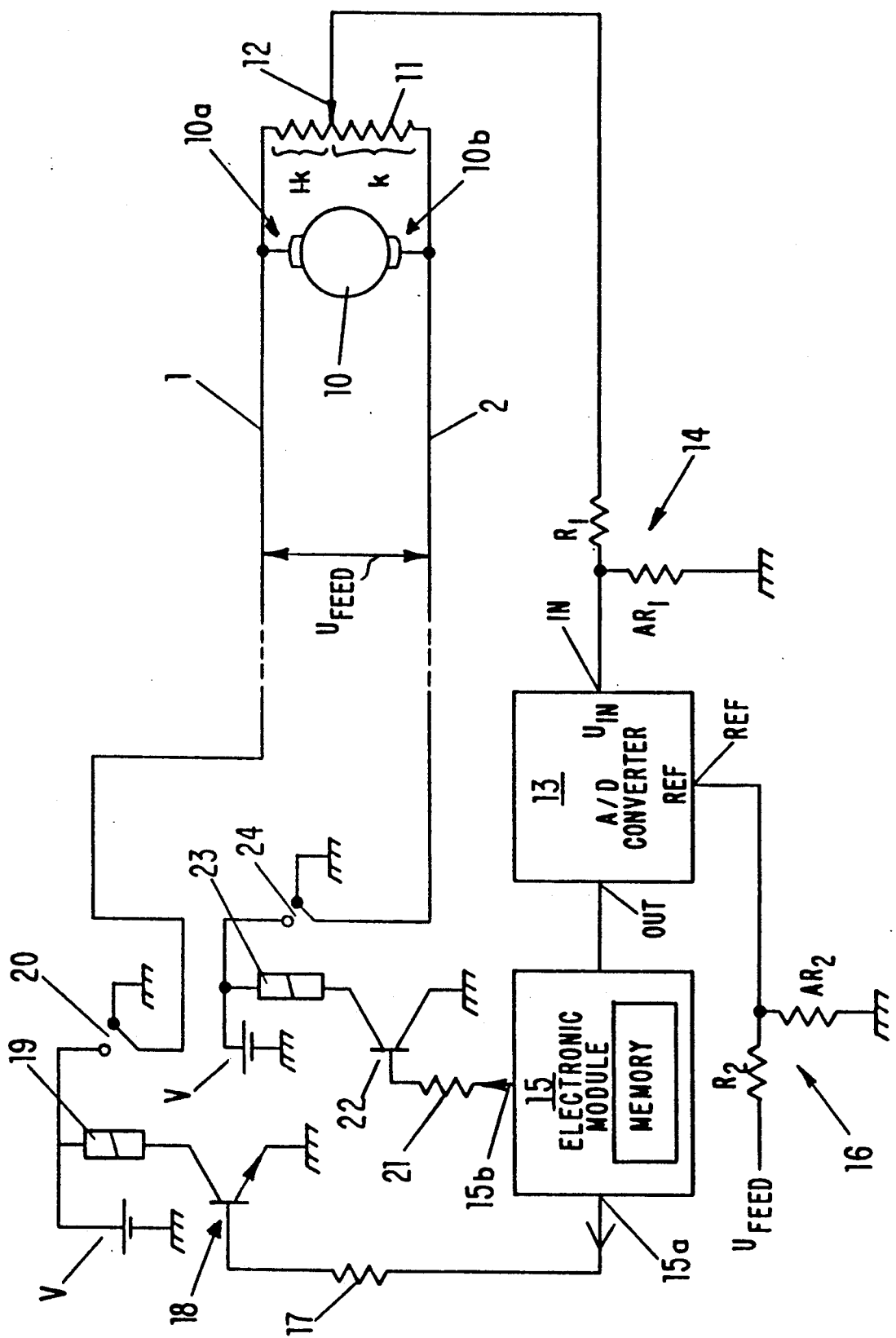

SIMPLIFIED SUPPLYING SYSTEM OF THE POSITION IDENTIFICATION POTENTIOMETERS OF ELECTRONIC MEMORY MECHANISMS OF A MOTOR FOR SETTING AUTOMOBILE VEHICLE SEATS AND THE LIKE

This application is a continuation in part of application Ser. No. 547,599, filed Jul. 2, 1990, now abandoned.

BACKGROUND AND OBJECTS OF THE INVENTION

The present invention relates to a simplified supplying system of the position identification potentiometer of electronic memory mechanisms of a motor for setting an adjusted position of automobile vehicle seats and the like.

At present, each seat setting electronic memory mechanism is connected by an array of five lines to an electronic module which is internal or external to the seat.

Actually, two lines are respectively connected to the terminals of the mechanism setting motor in consideration so as to supply the motor with the battery voltage, two other lines are moreover respectively connected to the identification potentiometer terminals so as to supply this potentiometer with a voltage which is in general a regulated voltage of about 5 volts, whilst a fifth line connects the potentiometer slider to the electronic module, the signal corresponding to the position of the slider determining the setting position.

The present invention aims at omitting the connection of the two potentiometer supplying lines with the electronic module by connecting directly these two lines in parallel with the setting motor.

With such an assembly, it is unnecessary to provide a distinct supply for the potentiometer which is supplied only if the motor is itself energized.

However, since the polarity of the voltage applied to the motor has to be switched according to the rotation direction imposed to the motor, the potentiometer slider, supplied with the same voltage as the motor, does not apply to the electronics the same indication each time for a given position of the slider.

Thus and by way of example, let us consider a power supply of 12 volts and the slider on the ¾ of its maximum stroke (as shown in the accompanying drawing). For a given rotation direction of the motor, the signal issued from the slider will be of ¾×12 volts=9 volts with respect to ground, but it will be of only 12−9 volts=3 volts for the same position of the slider when the polarity will be reversed in order to rotate the motor in a reverse direction. It is therefore clear that the information treatment program has to be designed for supplying the voltage complement (i.e. in the present case 9 volts instead of 3 volts), or for "complementing" the value which is read as a function of the rotation direction.

Moreover, the power supplied to the electronics by the power source, that is the voltage of the vehicle battery, can vary within large limits, for example according to the temperature or to the charge level which is more or less high. In this respect, it can be admitted that a 12 volt battery supplies in fact a voltage varying between 8 and 20 volts. Thus and by way of example, it is seen that when the slider is half-way along its stroke, the corresponding signal issued from the slider will be of 4.5 volts if the battery supplies 9 volts, whilst the signal will be of 9 volts if the battery supplies 18 volts.

Consequently, the value of the signal transmitted to the computer controlling the motor may appear as at random since it does not necessarily refer to the value stored under identical conditions, which means that for a given stored value, the information applied to the motor will be variable, and therefore the setting of the corresponding motor will vary.

The hereabove proposed arrangement consisting in connecting directly in parallel with the setting motor the two potentiometers supplying lines, if it actually reduces efficiently the number of lines and avoids providing for an extra voltage source, seems however unapplicable in fact.

The present invention allows nevertheless to make such an arrangement possible.

SUMMARY OF THE INVENTION

According to the invention, the supplying system is characterized in that an identification potentiometer for setting an adjusted position is connected to terminals of a motor, which motor being supplied with a first voltage which is variable and switchable between two reverse polarity states according to a rotation direction of the motor, the potentiometer having a slider which is connected via a first dividing bridge to an input of an analog-digital converter that is subjected to a reference voltage connected to said first voltage via a second dividing bridge, an output of the analog-digital converter being connected to an electronic module, and with a resistor value of the first and second dividing bridges being equal to a product of a second resistor value of the first and second dividing bridges multiplied by a same coefficient.

Various other features of the invention will become more apparent from the following detailed

BRIEF DESCRIPTION OF THE DRAWING

An embodiment of the invention is shown, by way of a non limiting example, in the accompanying drawing, wherein:

The single FIGURE shows an electronic diagram of the supplying system according to the invention.

DESCRIPTION OF THE INVENTION

In the drawing, reference numeral 10 shows a motor of a seat memory mechanism of a known type for setting an adjusted position of a seat, and of which reference 11 denotes the position identification potentiometer. A slider 12 determines, on the potentiometer 11, two potentiometric values, respectively k and 1−k.

According to the invention, the potentiometer 11 is connected to terminals of the motor 10, and the motor 10 is supplied with a voltage $U_{feed}$ from a power source V which can however vary within large limits, and for example from 8 to 20 volts when $U_{feed}$ corresponds to the voltage supplied by a 12 volt battery, according to the temperature and the charge rate of the battery, as mentioned above.

Thus, the potentiometer 12 is supplied only if the motor 10 is itself energized. It should be noted in this respect that if 1 and 2 are the two feeding lines of the motor 10, the potential of 1 is positive or negative in relation with the potential of 2 according to the motor rotation direction, this rotation direction varying when the polarity of $U_{feed}$ is switched in a corresponding manner.

The slider 12 of the potentiometer 11 is connected to input In of an analog-digital converter 13 via a dividing bridge 14, a resistor of which, having a value $R_1$, is connected to the slider 12, and the other resistor of which is connected to the supplying system ground and has a value $AR_1$, A being a given multiplying coefficient. The analog-digital converter 13 receives therefore a voltage $U_{in}$ derived from the voltage $U_{feed}$ and having a value which is variable since $U_{feed}$ varies as mentioned above.

The output Out of the analog-digital converter 13 is connected in a known manner to an electronic module 15, including an electronic memory which may be a microcontroller of a type well known in the art of the seat setting electronic memory mechanisms. The electronic module 15 is mounted internal or external to the seat the adjusted position of which has to be set by the motor 10.

The drawing shows that, in a manner which is not unusual, the analog-digital converter 13 is subjected here to a reference voltage which is not a fixed voltage. Actually, the reference input Ref of the analog-digital converter 13 is connected to the same voltage $U_{feed}$, that is to a voltage which is variable, via a dividing bridge 16 having a resistor of a value $R_2$ which is connected to the voltage $U_{feed}$, and another resistor connected to the ground and having a value $AR_2$, A being the same multiplying coefficient as for the dividing bridge 14. The analog-digital converter 13 is thus subjected to a voltage $U_{ref}$ derived from the voltage $U_{feed}$, and therefore having a variable value.

As shown in the drawing, the electronic module 15 has two outputs 15a, 15b that are respectively controlled by its memory. The output 15a is connected via a resistor 17 and a transistor 18 to a first relay 19 that controls a switch 20 which, when opened as shown, is connected to ground, and, when closed, is connected to the line 1 to apply a voltage from a power source V to the terminal 10a of the motor 10, which then has its terminal 10b connected to ground through the line 2 as explained hereinafter.

The output 15b of the electronic module 15 is connected via a resistor 21 and a transistor 22 to a second relay 23 that controls a switch 24 which, when opened as shown, is connected to ground, and, when closed, is connected to the line 2 to apply a voltage from the power source V to the terminal 10a connected to ground through the line 1 as explained hereinafter.

The drawing illustrates the state in which the two relays 19 and 23 are not activated, the switches 20, 24 being connected to ground, as is the case when the electronic module 15 does not send any information to outputs 15, 15b.

When a signal is sent from the electronic module 15 through the output 15a to activate the relay 19, the switch 20 closes, while the switch 24 remains connected to ground since its relay 23 is not activated.

The motor receives $U_{feed}$ on the terminal 10a, the terminal 10b being grounded, and the motor 10 rotates in a first rotational direction.

However, when a signal is sent from the electronic module 15 through the output 15b to activate the relay 23, the switch 24 closes, while the switch 20 remains connected to ground since its relay 19 is not activated.

The motor 10 receives $U_{feed}$ on the terminal 10b, the terminal 10a being grounded, and the motor 10 rotates in a second rotational direction.

As seen hereabove, two cases should now be examined according to the rotation directions of the motor 10.

First case

The potential of the line 1 is positive with respect to the potential of the line 2 (first rotation direction).

The analog-digital converter 13 establishes then a relation ratio between $U_{ref}$ and $U_{in}$ (in general, on eight bits because of the electronic module to which it is connected) such as $$\frac{U_{in}}{U_{ref}} = \frac{A \times k \times U_{feed}}{A \times U_{feed}} = k$$

Second case

The potential of the line 2 is positive with respect to the potential of the line 1 (second rotation direction).

The converter then samely establishes a relation ratio between $U_{ref}$ and $U_{in}$, and there is obtained:

$$\frac{U_{in}}{U_{ref}} = \frac{A \times U_{feed} \times (1 - k)}{A \times U_{feed}} = 1 - k$$

From the foregoing disclosure, it is noted that the relation ratio between the voltages $U_{ref}$ and $U_{in}$ is, in both the first and the second case, independent of the supplying voltage $U_{feed}$, and depends only on the position of the slider 12. This relation ratio is directly a function of the accuracy of the potentiometer 11, and for a given position of the slider 12 corresponding to a given value stored in the electronic module 15, the information applied to the motor 10 will always be the same and does not depend on the power supply source of variable voltage $U_{feed}$.

Therefore, it is possible to store with precision the adjusted positions of the motor 10.

However, it is necessary to use precision resistors for the dividing bridges 14 and 16. When the voltage is reversed, one will only have to take the complement to 1 (that is FF in hexadecimal), which will be easily made by the electronic module 15 that has been programmed accordingly in a known manner for example with a keyboard/display, ROM, chip, microprocessor, and the like. Respective programming techniques and means are well known in the art and need not be elaborated. Electronic modules and their function as a memory from which data may be recalled when needed are well known in the art of electronics and have been used in the field of electronic memory mechanisms of a motor for setting automobile vehicle seats for some time. Non-limiting examples of such electronic modules are disclosed in U.S. Pat. Nos. 4,204,255 and 4,404,632, the disclosure of these patents being included herewith by reference; however, any other suitable electronic module may be used in the present invention. This particular aspect of the present invention need not be described in further detail to a person skilled in the art since it is not within the scope of the invention which is the reduction of the number of connections between the elements of a position adjusting synchronization mechanism.

As shown in the drawing, when it is desired to set the motor 10 into an adjusted position corresponding to one that is stored in the memory of the microcontroller, the microcontroller 15 will drive the motor 10 in one direction or another, depending on which one of the outputs 15a or 15b is energized by the memory of the microcontroller 15.

The invention is not limited to the embodiment shown and described in detail, since various modifications can be carried out without departing from its scope shown in the appendant claims.

What we claim is:

1. A simplified supplying system for potentiometers usable in an electronic memorization of position of a motor, said supplying system comprising:

an electronic module; and an identification potentiometer for setting an adjusted position connected directly in parallel to terminals of said motor, said terminals of said motor being supplied with a first voltage that is variable and switchable between two reverse polarity states according to a rotation direction of said motor, wherein a reversal of one of said polarity states results in a reversal of voltage applied to said potentiometer, with said potentiometer having a slider that is connected via a first dividing bridge, which includes a first resistor connected to said slider of said potentiometer and a second resistor connected to a ground of a supplying system, to an input of an analog-digital converter that is subjected to a further reference voltage connected to said first voltage via a second dividing bridge, which includes a third resistor connected to said first voltage and a fourth resistor connected to a ground of a supplying system of said first voltage, with an output of said analog-digital converter being connected to said electronic module, and with a resistor value of said second and fourth resistors of said first and second dividing bridges being equal to a product of a resistor value of said respective first and third resistors multiplied by a same coefficient A.

* * * * *